(12) United States Patent
Aguttes et al.

(10) Patent No.: US 6,215,458 B1
(45) Date of Patent: Apr. 10, 2001

(54) OBSERVATION OR TELECOMMUNICATION SATELLITES

(75) Inventors: Jean-Paul Aguttes, Toulouse; Eric Conde, Aigrefeuille; Jacques Sombrin, Toulouse, all of (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 08/973,164

(22) PCT Filed: Mar. 18, 1997

(86) PCT No.: PCT/FR97/00478

§ 371 Date: Feb. 3, 1998

§ 102(e) Date: Feb. 3, 1998

(87) PCT Pub. No.: WO97/34801

PCT Pub. Date: Sep. 25, 1997

(30) Foreign Application Priority Data

Mar. 20, 1996 (FR) .................................................... 96 03444
Jun. 7, 1996 (FR) .................................................... 96 07064

(51) Int. Cl.$^7$ .............................. H01Q 1/38; H01Q 15/20

(52) U.S. Cl. .................................. 343/915; 343/700 MS; 343/DIG. 2

(58) Field of Search ..................................... 343/882, 915, 343/DIG. 2, 881, 700 MS; H01Q 1/38, 15/20

(56) References Cited

U.S. PATENT DOCUMENTS

| | | | |
|---|---|---|---|
| 3,427,623 | * 2/1969 | Yater | 343/705 |
| 3,540,048 | * 11/1970 | Clemens, Jr. | 343/705 |
| 3,699,581 | * 10/1972 | Hall et al. | 343/915 |
| 5,642,122 | * 6/1997 | Lockie et al. | 343/881 |
| 5,927,654 | * 7/1999 | Foley et al. | 244/173 |

FOREIGN PATENT DOCUMENTS 0 640 844 A1  3/1995  (EP) ............................. G01S/13/95

OTHER PUBLICATIONS

Benz, R., et al., "Multimission Capability of the European Polar Platform," Igarss '89, 12th Canadian Symp. on Remote Sensing—Remote Sensing: An Economic Tool for the Nineties, vol. 2, Jul. 10–14 1989, Vancouver, Canada, pp. 570–574.

(List continued on next page.)

*Primary Examiner*—Hoanganh Le
(74) *Attorney, Agent, or Firm*—Connolly Bove Lodge & Hutz LLP

(57) ABSTRACT

The low earth orbit radar remote sensing or telecommunication satellite includes an antenna forming member in a plane passing through the center of Earth, for example, the plane of its orbit. The antenna(s) are on one or both faces of the member. The height of the antenna forming member is greater than its dimension in the direction of travel of the satellite, so that the satellite is naturally stabilized by the gravity gradient. The solar generator cells are carried by the antenna forming member on the face that is kept facing towards the Sun in the case of a 6 H/18 H local time heliosynchronous orbit. The antenna forming member comprising a plurality of hinged panels over which the received or transmitted wave phase control means are distributed, it includes a plurality of GPS sensors distributed over the panels, enabling measurement and subsequent compensation by the phase-shifters of deformations of the member. At launch, the panels are folded into an elongate cylindrical shell along the launch system axis and having a pyrotechnic trap allowing deployment of the panels. In orbit, this shell constitutes the equipment module integrating all the equipment units other than the panels.

40 Claims, 5 Drawing Sheets

OTHER PUBLICATIONS

Hightower, Charles H., et al., "A Space–Fed Phased Array for Surveillance From Space," 1991 IEEE National Radar Conf., Mar. 12, 1991, Los Angeles, Cal., pp. 41–45.

Karnevi, S., et al., "Envisat's Advanced Synthetic Aperture Radar: ASAR," 2521 ESA Bulletin (1993) Nov., No. 76, Noordwijk, NL, pp. 30–35.

Im, Eastwood, et al., "Tropical Rain Mapping Radar on the Space Station," IGARS '89, 12th Canadian Symposium on Remote Sensing—Remote Sensing: An Economic Tool for the Nineties, vol. 3, Jul. 10–14 1989, Vancouver, Canada, pp. 1485–1490 and FIGS. 3, 10.

Attema, Evert P.W., "The Active Microwave Instrument On–Board the ERS–1 Satellite," 8078, Proceedings of the IEEE 79 (1991) Jun. No. 6, New York, US, pp. 791–799.

\* cited by examiner

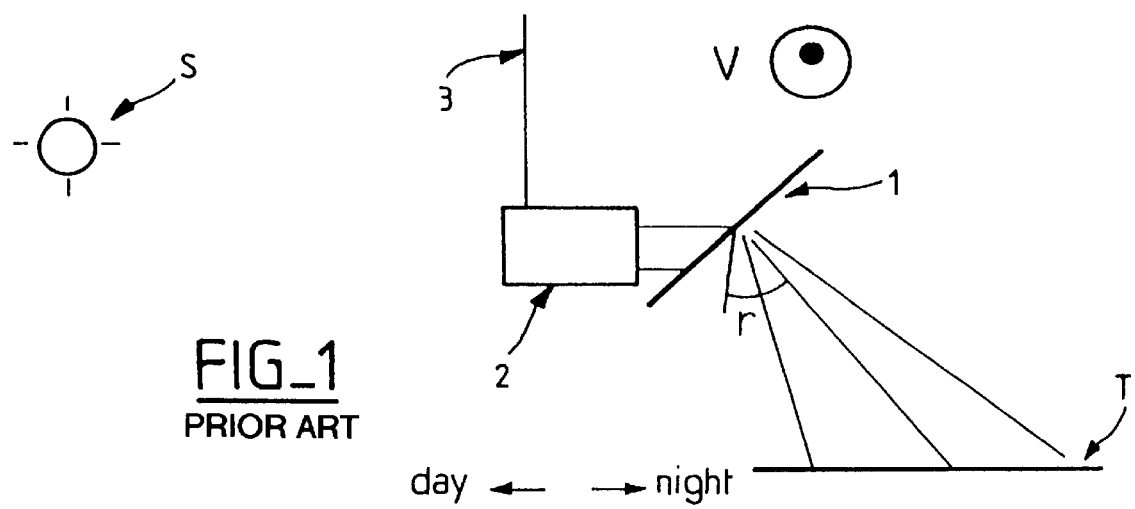
FIG_1
PRIOR ART
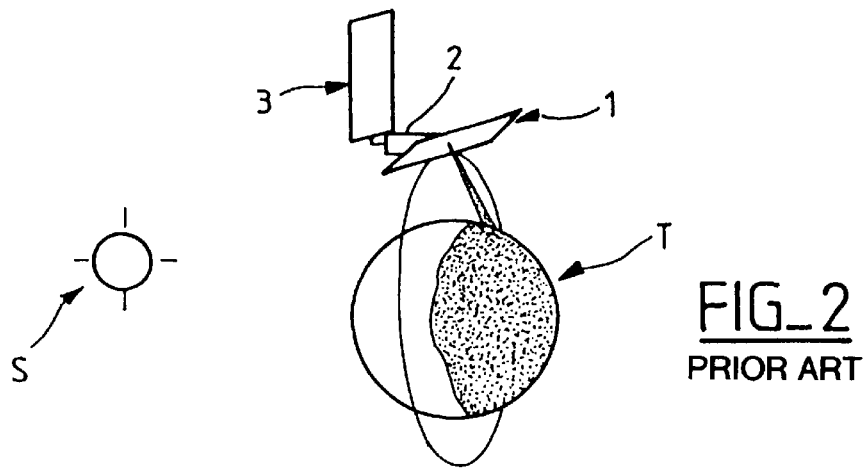
FIG_2
PRIOR ART
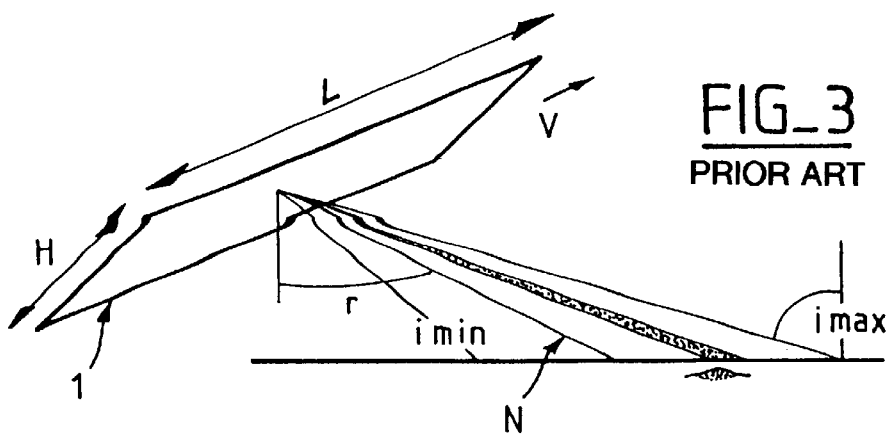
FIG_3
PRIOR ART

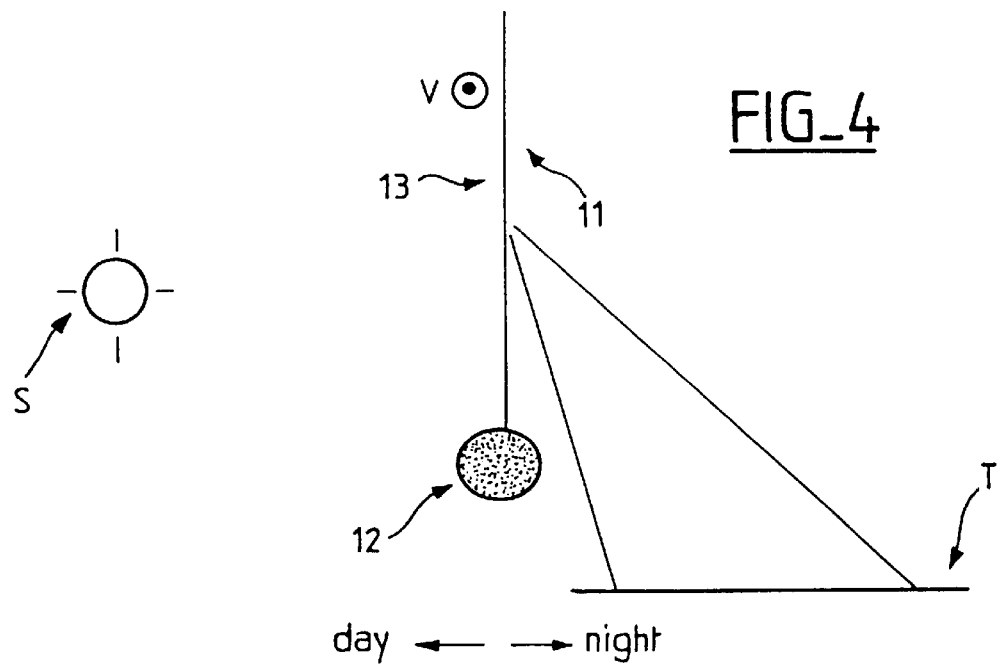
FIG_4
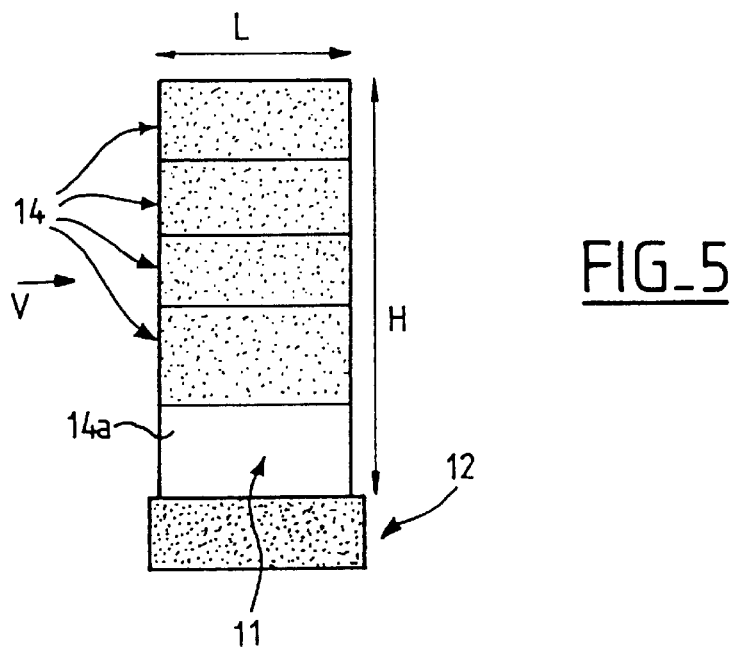
FIG_5
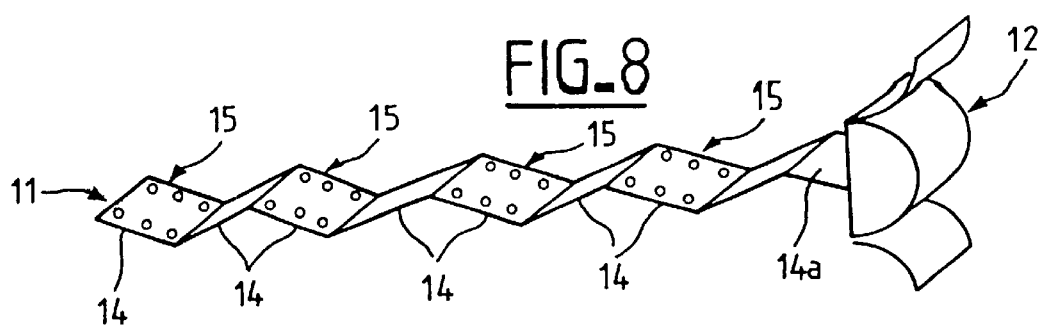
FIG_8

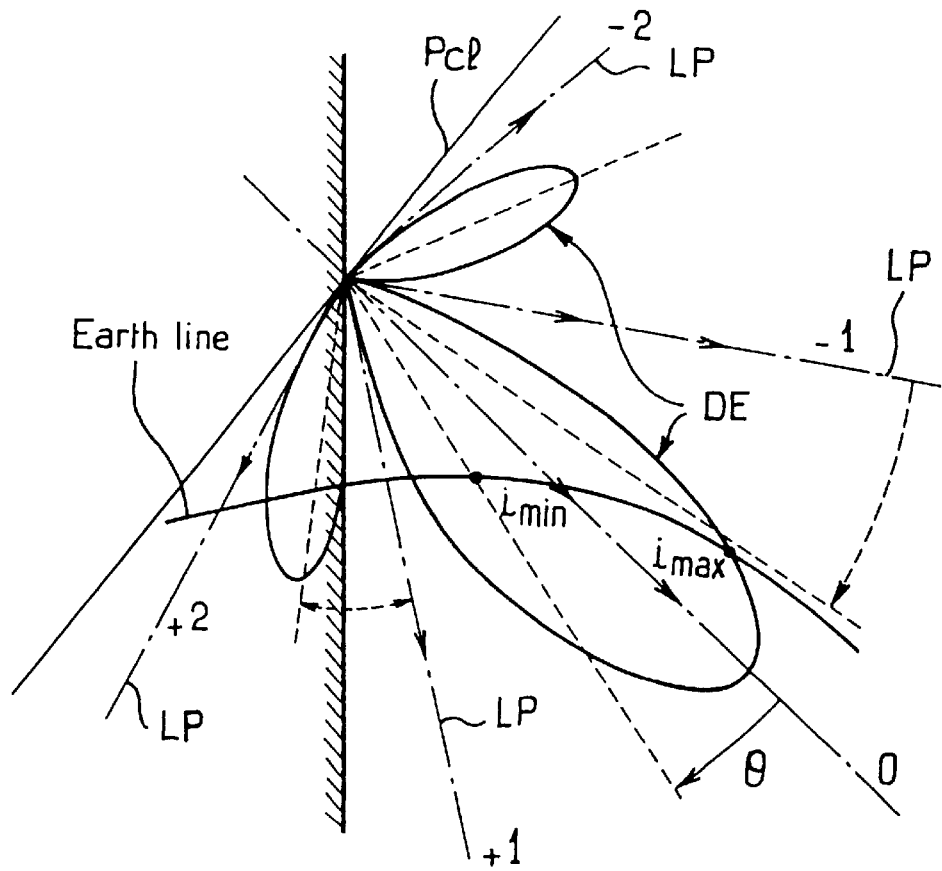
FIG_6
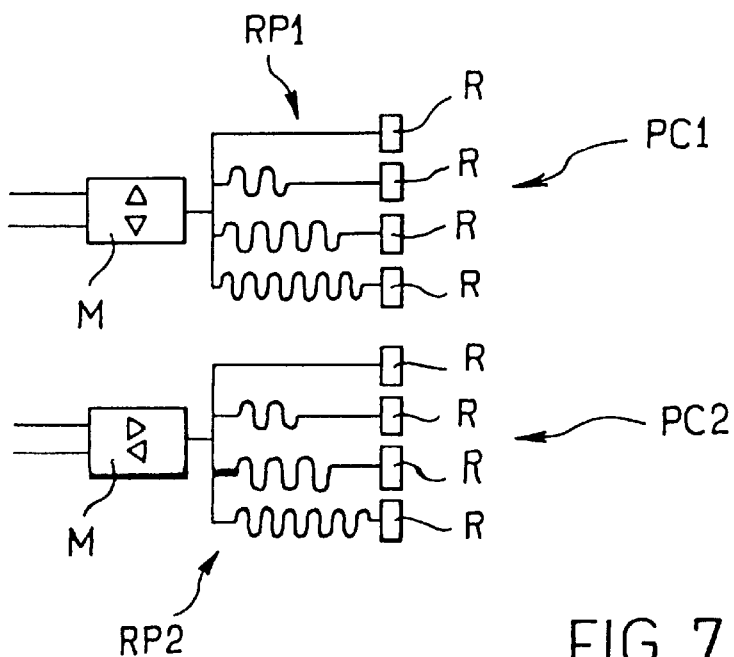
FIG_7

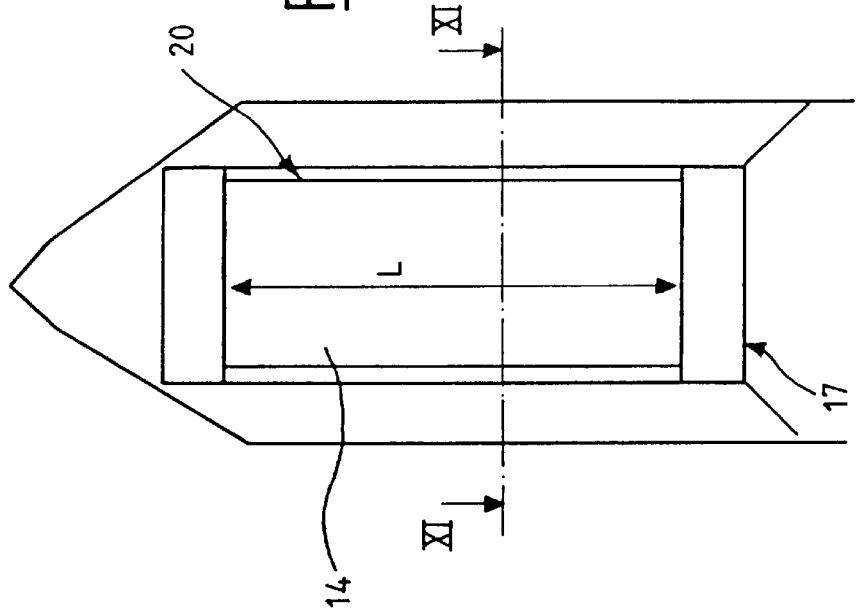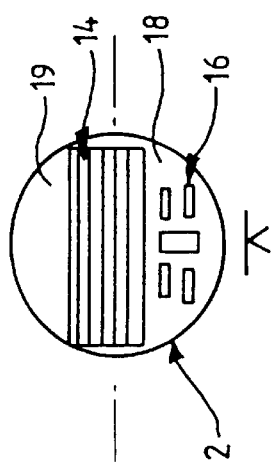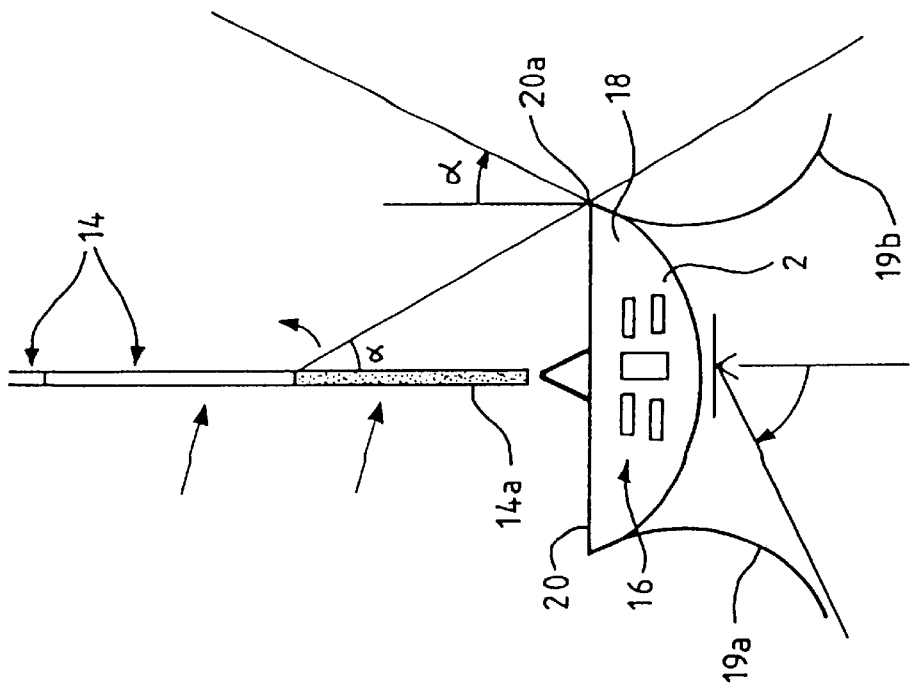

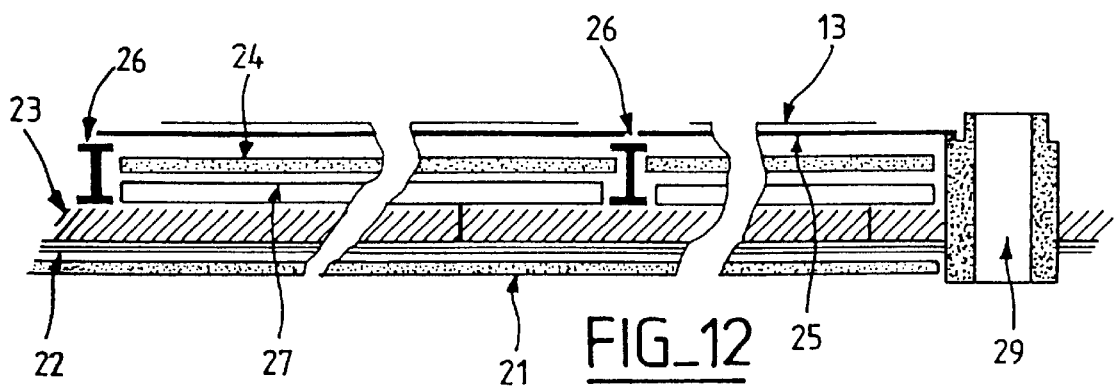
FIG_12
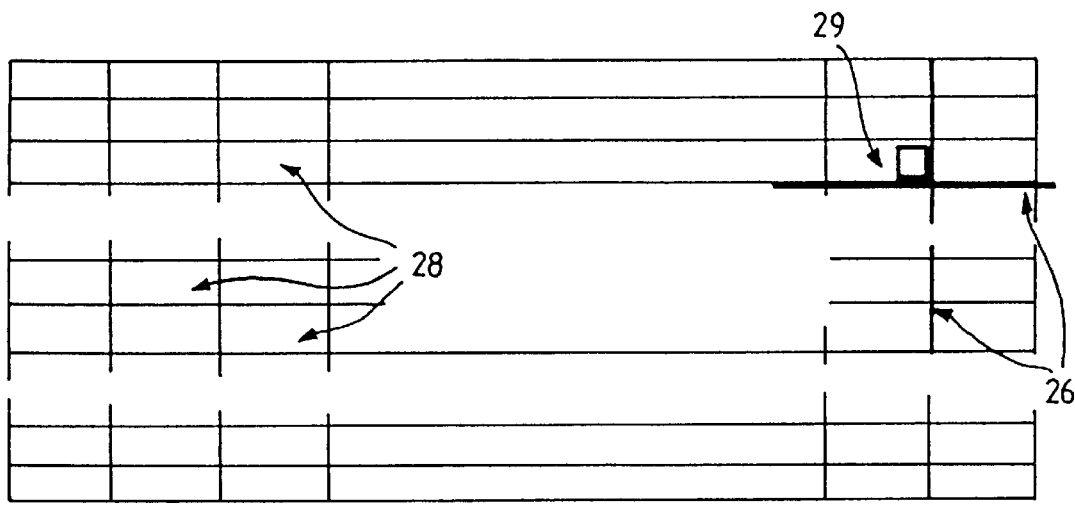
FIG_13
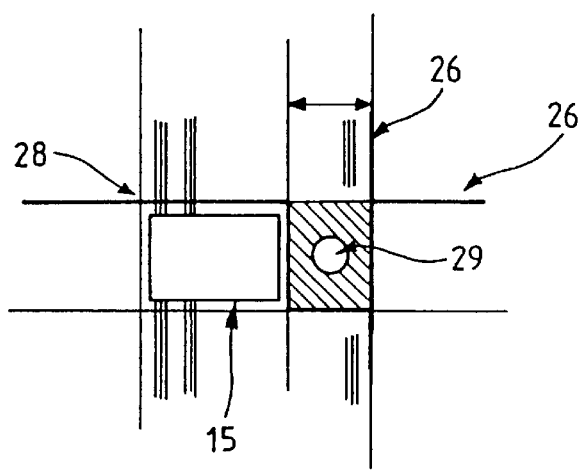
FIG_14

OBSERVATION OR TELECOMMUNICATION SATELLITES

The present invention concerns a space satellite.

In the remainder of the text, the invention will principally be described in the case of a radar remote sensing satellite.

As will be readily understood the description, applies with equal advantage to telecommunication satellites.

Similarly, the invention will be described in the case of an orbit around the Earth. Other heavenly bodies would of course be possible.

DESCRIPTION OF THE PRIOR ART

As shown in FIGS. 1 to 3, a radar satellite usually comprises a rectangular plane antenna 1, an equipment module 2 and solar panels 3.

The solar panels 3 are oriented towards the sun S and the antenna 1 is oriented towards the earth T and images laterally relative to the speed vector V of the satellite.

The various parameters of a satellite of this kind are as follows.

Dimensions of the Radar Antenna

The dimension of the antenna 1 in the direction of the speed vector V of the satellite, i.e., its length L in FIG. 3, is directly related to the resolution of the image along this same axis (azimuth or Doppler resolution), in a ratio between 1.1 and 2.

Perpendicularly to the speed vector V, the height H of the antenna 1 increases in direct proportion to the ground swath of the image (the width of the image on the ground transversely to the speed vector), the maximum incidence (the angular difference between the boresight and a vertical line through the imaged point on the ground) and the altitude, and in inverse proportion to the length L. Moreover, for given values of the preceding parameters, the height is directly proportional to the wavelength of the radar.

Consequently, a low-resolution radar (<10 m) uses an elongate antenna along the speed vector (L=15 m and H=1.5 m in the case of RADARSAT), whereas a medium or high resolution (<5 m) can lead to antennas having H much greater than L, especially at low frequency (L or S band) or with a plurality of frequencies with juxtaposed antennas along the height H.

Roll Inclination

As shown in FIG. 3, the adjustment about the roll axis of the boresight of the antenna 1 beam locates the image a greater or lesser distance away from the vertical line through the satellite (coverage of the incidence range). This adjustment is now obtained by electronic scanning between two incidences $i_{min}$ and $i_{max}$, but in order to limit the scanning range and the height of the antenna 1, the latter is oriented so that its normal N is aimed in a median direction in the incidence range. The roll angle r is typically 30°.

Power and Local Orbital Time

Unlike optical remote sensing, radar remote sensing does not require any particular conditions of solar illumination of the scene. On the other hand, it consumes satellite electrical power. All this leads to the adoption of a heliosynchronous orbit of local time 6 H or 18 H, enabling the solar panels 3 of the satellite to remain exposed to the sun and generating energy virtually continuously (few eclipses, unlike a diurnal local time such as is used in optical remote sensing) (see FIG. 1).

The solar generator constituted by the panels 3 is generally insufficient to power the radar. The satellite also carries batteries from which the radar draws power. These batteries are charged when the radar is not operating.

Note that this approach is also a result of the fact that radar satellites use equipment modules that are not specially designed for this purpose, and are therefore compatible with diurnal orbits which require the provision of large batteries to cater for long eclipse times.

Dimensional and Attitude Stability

To function correctly the antenna 1 must remain flat and accurate pointing of the axis N normal to its surface must be maintained. The conventional approach is to impose a rigorous mechanical dimensional stability on the antenna assembly 1 and equipment module 2 and to have the attitude control system of the equipment module 2 handle pointing requirements.

It has already been proposed that, when electronic scanning antennas 1 are used, requirements in respect of the flatness and the attitude of the antenna panel should be relaxed and the phase-shifters of the antenna elements that constitute the antenna 1 should be controlled to reconstitute a correctly oriented perfect wave plane. This relaxes the structural constraints for the combination of the satellite and the antenna, and the attitude control system of the module 2 then has only a relatively coarse role.

This principle of decentralized adaptation at the level of the antenna 1 is essentially based on the ability to measure its deformations from flatness and the attitude of its median plane.

Until now, however, the proposed applications based on deformation or flatness sensors (especially optical sensors) have not been entirely satisfactory. Moreover, they do not allow measurement of the attitude of the frame of reference of the antenna 1, which must remain entirely the responsibility of the equipment module or be effected by means of absolute attitude sensors on the antenna 1.

Regardless of how these decentralized adaptation techniques may evolve, the attitude system of the equipment module 2 remains responsible for maintaining the reference position of the antenna 1. In particular, the axis of the greatest dimension (lowest inertia) must be kept aligned with the speed vector (with the length L for a low-resolution radar), or normal to the speed vector with a roll angle as previously mentioned (dimension H for a high-resolution radar), such that the equipment module must compensate for gravity torques continuously. This compensation imposes continuous torques from the attitude control system and a minimal mechanical rigidity of the satellite as a whole and of the mechanisms for deploying the antenna in order to transmit these torques. Note also that the presence of the equipment module 2 introduces its own inertia constraints and, with the solar pressure exerted on the solar panels 3, another disturbing torque.

SUMMARY OF THE INVENTION

The invention consists in a new type of satellite, in particular a radar remote sensing or telecommunication satellite.

One object of the invention is to propose a satellite of improved sensitivity compared to prior art satellites, allowing better operational performance in terms of accessibility and repeatability.

Another object of the invention is to propose a satellite of simplified construction, in particular allowing a large reduction in the cost of the antenna, the launch system and the equipment module, together with an increase in reliability and durability.

To this end, the invention proposes a low Earth orbit remote sensing or telecommunication satellite including a generally plane antenna forming member, wherein the antenna forming member lies substantially in a plane passing through the center of the Earth, for example in its orbital plane.

In accordance with another, independent aspect, the invention proposes a satellite that includes a solar generator and the solar generator cells are carried by the antenna forming member.

The satellite proposed by the invention is advantageously such that the height of the antenna forming member defined by the dimension along the gravity axis is greater than its dimension perpendicular to this axis, so that the satellite is naturally stabilized about the roll and pitch axes by the gravity gradient.

In particular, the antenna forming member may advantageously include an optionally partly hollow part with no antenna function which contributes to natural stabilization of the satellite about the roll and pitch axes by the gravity gradient.

In accordance with one independent aspect, the invention proposes a remote sensing or telecommunication satellite including a generally plane antenna forming member, wherein the antenna forming member has a deformable geometry and includes transmitted or received wave control means distributed over its surface, and it further includes a plurality of position and/or deformation and/or misalignment sensors distributed over the antenna forming member and allowing measurement of deformations and/or misalignments and their subsequent compensation by the control means.

The sensors are advantageously terrestrial or satellite radio positioning sensors, for example GPS sensors, which also enable measurement of absolute attitude errors and their subsequent compensation by the control means.

In accordance with another and also independent aspect, the invention proposes a launch configuration of a remote sensing or telecommunication satellite including at least one plane member made up of a plurality of panels hinged together, such as an antenna forming member, and associated equipment units or ancillary equipment units, wherein said satellite includes a support envelope that integrates in its interior at launch the equipment units and the panels and which has a pyrotechnic trap for deployment of the panels.

In an advantageous first variant, the support envelope includes two half-shells, one of which integrates the various associated and ancillary equipment units and the other of which carries a pyrotechnic cutter delimiting a trap with two flaps and the explosion of which defines and ejects the two flaps which are thereafter held open by two hinges disposed along the interface with the first half-shell so that the panels can be stowed at launch in the housing defined between the shells and thereafter deployed on one side only of the satellite through the trap.

In another possible variant, the support envelope is made up of two shells assembled onto a median part, the median part integrating the various associated and ancillary equipment units, while each of the lateral shells carries a pyrotechnic cutter delimiting a trap with two flaps and the explosion of which defines and ejects the two flaps which are thereafter held open by two hinges carried on the same half-shell and disposed along the interface with the median part, so that the panels can be stowed at launch in the two housings defined between each of the lateral shells and the median part and thereafter deployed from each side of the satellite through the corresponding trap.

A satellite that has these various features alone or in combination is advantageously completed by the various following features, also taken alone or in any technically feasible combination:

the antenna forming member has antenna functions on both faces;

one part of the antenna forming member does not carry solar cells and acts as an antenna on both faces;

it includes means for differential treatment of phase measurements on radio positioning signals supplied by each sensor for measuring the relative sensor positions and the absolute attitude of the median plane defined by the sensors;

it includes an equipment module which intercepts the plane of the orbit and the antenna forming member is situated on one side only of this equipment module;

it includes an equipment module which intercepts the plane of the orbit and the antenna forming member extends on both sides of the equipment module;

the two parts of the antenna forming member are in two separate planes the intersection of which passes through the center of the Earth;

it includes an equipment module the center of gravity of which is on the shortest inertia axis of the antenna forming member so that natural equilibrium due to the gravity gradient along the local vertical of the antenna forming member is reinforced and so that the solar pressure torques on the satellite are limited;

it assures for the antenna or antennas of the member minimal masking by the equipment module and for the radio positioning sensors an angular offset relative to the normal to the member of the direction of reception of radio positioning signals short of which there is no multipath by reflection at the module and beyond which the signals are ignored;

the solar cells cover the energy requirements of at least one antenna of the antenna forming member;

a part of the antenna forming member has no antenna function and carries solar cells;

the solar cells, which cover the energy requirements of the aforementioned antenna, are disposed on the back of the antenna, and optionally on spaces having no antenna function on either side of the antenna;

the solar cells of the antenna forming member cover the energy requirements of the latter;

the part or parts having no antenna function which carry solar cells provide at least a power supply to the equipment module between eclipses;

an antenna features a mesh of coupled electronic surface elements provided directly by a block of one or more solar cells;

the block of solar cells directly faces the surface element;

the solar cells are cells using the AsGa or silicon technology;

the antenna forming member comprises a plurality of different antennas operating at the same or different frequencies juxtaposed along the gravity axis;

the antenna forming member includes two antennas for the same frequency enabling interferometric radar remote sensing, the antennas being separated along the local vertical axis;

during the launch phase, the panels are folded and pressed against a plate to which they are attached by tie-rods;

at least one sleeve adapted to have a tie-rod pass through it for fixing it to the plate passes through each panel;

the shortest inertia axis of the support envelope and of the various panels is oriented at launch along the launch system axis and the deployment axis is normal to the launch system axis;

the exterior shape of the support envelope in the launch configuration is adjusted aerodynamically to substitute for the payload fairing;

the support envelope and the associated and ancillary equipment units constitute the equipment module, the shortest inertia axis of the latter being parallel to the plane of the orbit;

deployment is effected in the vertical direction;

a panel has a sandwich structure comprising an optional radome, a radiating panel, an intermediate NIDA structure carrying electronic equipment, an optional thermal protection layer, a plate that carries the solar cells and/or radiating elements, the panel further including stiffeners disposed on the intermediate structure to support the plate or plates that carry the solar cells and/or radiating elements;

a sleeve is disposed in the vicinity of the crossover between two stiffeners;

all portions of the member that differ in terms of their antenna function or in terms of the presence or absence of the antenna function are distributed along the deployment axis of the panels so that each of the panels has a high level of functional homogeneity;

the feed to the microwave distribution system is daisy-chained from the side of the antenna forming member opposite the heavenly body about which the satellite is in orbit, the daisychain cable constituting a part of the necessary delay lines;

the satellite has along the height of the antenna an array of points for elevation control of the diagram of the antenna, the elementary diagram in elevation of the antenna portion associated with each control point is oriented in a fixed manner to cover the useful incidence envelope, and the spacing between these points along the height H is such that the spurious lobes associated with the array exist at the time of depointing of the main lobe relative to the direction aimed by the elementary diagram but the modulation of the gain of these unwanted lobes exerted by the elementary diagram guarantees a very low gain for those that might encounter the Earth and preserves a minimal gain on the main lobe;

the elementary antenna portion associated with each control point is constituted by parallel grouping from a common control point and in the direction of the height of a plurality of radiating elements and a constant phase-shifter profile with a fixed ramp is introduced between the radiating elements of the same control point.

Other features and advantages of the invention will emerge further from the following purely illustrative and non-limiting description.

DESCRIPTION OF THE FIGURES

FIG. 1, already discussed, is a schematic representation of a prior art remote sensing satellite;

FIG. 2 shows the orientation of the satellite from FIG. 1 in its heliosynchronous orbit around the Earth at the local time 6 H/18 H, in the case of an antenna in the plane of the orbit;

FIG. 3 is a schematic representation of the orientation of the antenna of the satellite from FIGS. 1 and 2;

FIG. 4 is a schematic side view of one embodiment of a satellite in accordance with the invention in the case of a 6 H/18 H heliosynchronous orbit and an antenna in the plane of the orbit;

FIG. 5 is a front view of the satellite from FIG. 4;

FIG. 6 shows the elevation diagram of the elementary antenna portion associated with a control point;

FIG. 7 shows one possible embodiment for obtaining the FIG. 6 diagram;

FIG. 8 is a perspective view of one embodiment of a satellite in accordance with the invention;

FIG. 9 is a schematic fragmentary sectional view of one embodiment of a satellite in accordance with the invention;

FIG. 10 is a schematic sectional representation of the launch configuration of the satellite from FIG. 9;

FIG. 11 is a sectional view taken along the line XI—XI in FIG. 10;

FIG. 12 is a sectional representation of a panel of one embodiment of a satellite in accordance with the invention;

FIG. 13 is a top view of the panel from FIG. 12;

FIG. 14 is a sectional view showing a detail of the panel from FIGS. 12 and 13.

DETAILED DESCRIPTION OF THE INVENTION

In FIG. 4 and subsequent figures, the reference number 12 designates the equipment module of the satellite in accordance with the invention which is shown therein. The reference numbers 11 and 13 respectively designate the antenna forming member and the cells of the solar generator.

Various aspects of the satellite shown in these figures are remarkable.

Its orbit is a low Earth orbit and the antenna forming member 11 lies substantially in a plane passing through the center of the earth (roll angle r of 90°).

It possibly has the capacity to radiate from both faces.

The height H of the member 11, defined as its dimension along the gravity axis, is naturally very much greater than its dimension L in the perpendicular direction (the direction of the speed vector V in FIGS. 4 and 5, which illustrate the situation in which the plane of the satellite is coincident with the plane of its orbit) or completed in the direction of the height H by a surface with no antenna function, possibly partly hollow, with the result that the satellite is naturally stabilised by the gravity gradient.

The solar cells 13 are disposed on one face of the antenna forming member 11, or possibly on both faces.

Phase and amplitude control points for the transmitted or received wave are distributed over the surface of the member 11.

This member tolerates a flexible structure, any deformations and absolute attitude errors of which are measured by processing phase measurements supplied by GPS sensors distributed over its surface and then compensated by the control means.

These various aspects, along with others, will now be described in detail.

Antenna Forming Member 11 in the Plane of the Low Earth Orbit of the Satellite

The expression "low Earth orbit" means an orbit at generally less than 2 000 km.

For the same intended range of incidence values, the electronic depointing of the beam in elevation, i.e., about an axis in the plane of the antenna and normal to the gravity axis, must be increased compared to a prior art antenna; compared to the prior art, and given the constraint that there should not be any spurious lobes associated with the array of radiating elements, this leads to a closing up of the spacing between radiating elements (to approximately 0.5 times the wavelength rather than 0.7 times the wavelength).

However, the maximum depointing angle of the antenna or antennas of the member 11 now corresponds to minimal propagation distances (low incidence values), which makes it possible to relax the requirement for low losses conventionally imposed on the radiating elements with high depointing and therefore to retain radiating member technologies similar to those for the standard geometry.

Moreover, as indicated in the next section, the proposed configuration of the satellite, because of its tolerance of the control network lobes, allows the spacing along the height H of the antenna of the control points of the antenna elevation diagram to be increased up to 2 λ or even 2.5 λ, although in the prior art an antenna inclined at less than 30° or 35° has to be limited to about 0.7 λ.

A result of all this is a relaxing of the electronic density along the height in a ratio as high as 2/0.7, i.e., 2.85.

Turning to the link balance, the increasing distance with incidence can now be more than adequately compensated by increasing the effective height of the antenna in the direction of the boresight (reduction of depointing). In the particular case of a radar, measurement sensitivity improves in direct proportion to incidence, just like the requirement for the geophysical phenomena to be measured, whereas the prior art conventionally provides sensitivity profiles with an inverse proportional relationship.

Compared to a prior art antenna inclined at 30° or 35°, obtaining a given incidence of the same antenna beam and therefore the same effective height requires an antenna height increased in a proportion that varies in inverse proportion to the incidence (only 10% at 60°). In radar in particular, expanding the range of incidence towards higher values of incidence conditions the obtaining of operational performance in terms of accessibility or repeatability (the time taken by the satellite for the antenna to come in view of a point or to return to that point), the antenna height handicap is very slight, in particular in very high performance systems allowing a maximal incidence greater than 60°.

The complexity, the mass and the cost of the array antenna (especially if it is an active antenna) being mainly dictated by the total number of control points, it can be seen that the new concept is highly favorable since it reduces this number in a ratio up to 2.85/1.1, i.e., approximately 2.7 (for a system catering for high incidences).

Unlike the prior art, the member 11 has two geometrically equivalent faces on which the radiating members of the antenna can be placed. By using both faces simultaneously, the range of incidence can be doubled, to the great benefit of operational performance which, already very good once high values of incidence are covered, thereby becomes exceptional. This can be achieved merely by duplication of the radiating elements, naturally using the same structure, but also the same electronic equipment units, which are an integral part of the electronically scanned antenna. In the prior art this duplication of large ranges of incidence requires total duplication of the antenna with two opposite roll angles.

The module 12 can also be in the plane of the member 11, for example under the antenna.

In this case, the member 11 advantageously includes at its base, alongside the module 12, a panel 14a with no antenna function (see FIG. 9), possibly hollow, and one function of which is to avoid blocking the field of view of the antennas proper vis-a-vis the equipment module 12 at low values of incidence.

It will be noted that the foregoing applies in a similar manner to communication satellites.

In the drawing figures, the antenna forming member 11 is shown on one side only of the equipment module 12. It can naturally extend to either side of the equipment module 12, although the presence of antennas below the module 12 requires a particular arrangement of the telemetry means.

Spacing of Antenna Control Points

The spacing of the control points along the height H of the antenna 11 determines the configuration of the unwanted lobes of the control network when the main lobe—i.e., the wanted lobe—is depointed in elevation. The gains of the main lobe and the unwanted lobes are modulated at the time of depointing by the fixed elevation radiation diagram of the elementary antenna portion associated with a control point.

FIG. 6 shows a combined configuration of unwanted lobes and elementary antenna portion diagrams obtained from a conventional antenna (the plane Pc1 of which corresponds to a roll angle less than 30° or 35°) when the spacing between control points is relaxed.

The diagram of the elementary antenna portion (solid spoon shapes DE in FIG. 6) allows a main petal normal to the antenna plane and oriented to the wanted range of incidence. The straight line segments marked with arrowheads indicate the positions of the unwanted lobes (LP) in the absence of depointing θ of the main lobe relative to the main axis of the diagram of the elementary antenna portion, which is here the normal to the antenna. The dashed line segments indicate these same positions after a depointing of θ. Without depointing, the unwanted lobes are eliminated because they lie in the gaps of the diagram of the elementary antenna portion. The unwanted lobes and the petals of the diagram of the elementary antenna portion move close together as the distance between the control points of the diagram along the antenna increases.

FIG. 6 also shows the Earth line.

For correct operation, two conditions must be met upon scanning θ along the range of incidence.

No unwanted lobe must encounter the horizon, or, if it does, it must do so with a very low gain (−30 dB to −40 dB below the gain of the main lobe), in order not to affect the level of ambiguities.

The gain of the main lobe (indicated by 0 in the drawing) must not drop too low, in order not to affect the link balance.

In the case of prior art satellites in which the antennas have a roll angle less than 30° or 35°, if the lobes −1 and +1 are not pushed back to the immediate vicinity of the plane of the antenna or beyond, by choosing a sufficiently small spacing between control points, there is no solution since a value θ is very quickly reached such that the high gain unwanted lobes (+1, +2, . . . , +N) point towards the Earth.

On the other hand, the same configuration as shown with unwanted lobes and elementary antenna portion diagram petals close together, obtained from an antenna with the new geometry, enables the problem to be solved. In this case, the high gain part of the unwanted lobes +1, +2, +n is imaginary because it is located to the rear of the antenna. This exploits the fact that the terrestrial field of view offered by the antenna geometry closely surrounds the field of view to be imaged.

Furthermore, if this antenna geometry is associated with the remainder of the architecture proposed for the satellite, this physical boundary of protection against the unwanted lobes is advanced towards the front of the antenna because the very low values of incidence are masked by the equipment module 12 without this generating ambiguities, since the signal reflected by the module is received during transmission.

With the new antenna geometry, it is sufficient to ensure that the −1 unwanted lobe does not encounter the horizon when depointing towards the minimum values of incidence and to comply with a maximal gain drop on the main lobe. By holding the −1 lobe on the horizon line, the reduced spacing between control points fixes the usable low incidence limit in respect of the 0 lobe.

By locking the elementary antenna portion diagram in a median direction between the horizon line and the minimum incidence, a minimal drop of 3.7 dB is guaranteed at the minimal incidence and a much lower drop at high values of incidence if the latter are set back relative to the horizon line. This drop is permissible because the new satellite concept often results in an energy surplus. If this is not the case, it is necessary to stop short of this ultimate spacing or to accept an increase in the low incidence limit.

Thus, with the new geometry it is possible to relax the spacing between control points to 2 $\lambda$ (or even to 2.5 $\lambda$, depending on altitude and incidence range conditions), whereas with the conventional geometry and an antenna inclined at less than 30° or 35°, the spacing remains below 0.7 $\lambda$ or 0.75 $\lambda$, i.e. the control increment must be coincident with the radiating element increment (one control point per radiating element).

Obtaining an elementary antenna portion diagram of this kind in which the main petal is depointed relative to the antenna normal in order to aim it at the wanted range of incidence can be obtained with an antenna having the new geometry by constituting the elementary antenna portion by grouping a plurality of radiating elements having a very open elementary diagram with a phase-shift between them according to a fixed phase ramp (in the heightwise direction).

This is what is shown in FIG. 7, which shows the radiating elements R controlled by two successive control points PC1 and PC2. The fixed phase ramp, which is identical for all the control points, is implemented by the progressive lengths of cable between the phaseshift/transmit/receive module M and the elements R, for example.

With this new geometry, the radiating element increment could also be relaxed, even if this entails the appearance of unwanted lobes of the radiating element array and the introduction of new losses on the main lobe (at low values of incidence). However, since this increment is now dissociated from the control point increment, and therefore no longer conditions the electronic density of the antenna, it is preferable to adopt a spacing (close to 0.5 $\lambda$) that excludes this other type of unwanted lobe.

Grouping of a Plurality of Elementary Antenna Portions per Controlled Time-Delay Section The signals emitted from each elementary antenna portion are all derived from the same source signal after specific adaptation of the phase, amplitude and time-delay. This time-delay adaptation guarantees a time-delay from the source to the target point on the ground independent of the antenna portion traversed. Similarly, on reception, the recombination of the various signals into one is carried out after specific adaptation of the phase, amplitude and time-delay. The receive time-delay adaptation assures a time-delay from the target point on the ground to the point of recombination of the signals that is independent of the antenna portion traversed. A time-delay difference has two effects, one of which is to spread the distance impulse response (for a radar), and the other of which is to introduce spurious scanning of the beam in elevation according to the frequency components of the signal.

When the antenna plane is normal to the boresight, the time condition is verified if the distribution of the signals to (and from) the antenna elementary portions is effected with equal lengths of cable. Otherwise, especially if the boresight can be commanded by electronic depointing, it is necessary to incorporate programmable delay lines to modulate the lengths over which the signals are distributed inside the antenna in order to maintain the independence of the total path to (and from) the target point. In order to reduce the number of programmable delay lines, it is permissible to group a plurality of antenna portions in the same commanded time-delay section. This produces a residual desynchronisation that is limited to the scale of the section, its magnitude increasing with the size of the section and the angle of depointing relative to the normal to the antenna.

The new antenna geometry could impose a penalty in terms of the number of commanded time-delay sections because of the high depointing in elevation. However, this depointing is effected about a non-null mean value, so that it is sufficient to introduce fixedly within the section the adaptation of length corresponding to the case of this mean depointing so that the residual effects are tied only to the incremental depointing on either side of the mean depointing, so that they can therefore increase the size of the section more than enough. It is almost as if the antenna were physically depointed in the mean direction.

Gravity Gradient Stabilisation

Given that the height H of the member 11 is very much greater than its dimension L—possibly having been made so by the non-functional extension 14a—the shortest inertia axis of the satellite is in its natural equilibrium position, provided that the member 11 is required to be in a plane passing through the center of the Earth, for example coincident with the plane of its orbit.

The result of this is stabilization of the satellite in roll and in pitch by the gravity gradient.

The dimensions of the antenna forming member 11 produce a natural restoring torque against pitch or roll disturbances that can be expected in orbit.

The position of the equipment module 12 in line with the member 11 does not generate any disturbances and, because of its high density, even contributes to increasing the restoring torque based on the difference between the greater and the lesser inertia of the system.

The part 14a that has no antenna function, and which can even be partially hollow, can be adjusted to obtain the required gravity gradient conditions in the event of insufficient restoring torque due to the gravity gradient, in particular in the event of an insufficient height H.

This restoring torque is effective against disturbances in roll and in pitch, but does not compensate at all disturbances about the yaw axis.

Yaw control is effected by the attitude and orbit control system of the module 12.

The role of the latter with respect to disturbances in roll and in pitch is simplified compared to its usual role, since it can be limited to damping the pendulum effects of the gravity gradient restoring torque.

The main permanent unwanted torque in yaw is due to solar pressure.

It will be noted that the very high degree of homogeneity of the configuration of the satellite shown in the drawing figures greatly favors limitation of the cause of this unwanted torque, namely the shifting along the speed vector of the centers of mass and thrust.

Solar Cells 13 on One or Both Faces of the Antenna Forming Member 11

The antenna of the satellite is preferably in the plane of the orbit and the orbit of the satellite is preferably heliosynchronous, so as to preserve a minimal solar aspect angle with the solar cells placed on a particular face of the antenna forming member 11. The antenna face then occupies the shaded face of the member 11 and can also occupy the other face in parts that are not occupied by the solar cells. A local time of 6 H or 18 H is optimal because the angular offset is limited to around 30° (the cumulative effect of the inclination of the orbit and of the ascension of the sun). However, the large area of solar cells that can be obtained in this way makes greater offsets relative to the 6 H/18 H orbital plane feasible.

Although heliosynchronism at a fixed local time facilitates the thermal design of the member 11, the satellite can also be designed to be able to change local time, including on either side of the 12 H/24 H plane, or even to operate with a drifting local time (no heliosynchronism, but orbit still inclined). For this, it is sufficient for both faces of the member 11 to have spaces covered with solar cells at the cost of an increase in the total area of solar cells. It is nevertheless certain that operation cannot be assured when the local time is close to 12 H/24 H.

The density of the solar cells 13 on the back of the member 11 may be chosen to cover the energy requirements of the antenna without any battery relay. If necessary, the member 11 can include portions that have no antenna function but carry solar cells.

Accordingly, re-use of the mechanical structure of the member 11 produces a very powerful solar generator, much more powerful even than those accompanying the highest performing standard equipment modules, and additionally enables extreme simplification of the power supply subsystem of the equipment module 12 where the latter has only to meet its own requirements.

Each equipment or equipment group of the member 11 may be coupled directly to its power source so that the energy conversion and transmission functions are simplified and no longer involve the equipment module 12, or even a connection to the latter.

This principle of energy autonomy is of even greater benefit in the case of an active antenna or active antennas where there is already a high degree of electronic meshing, i.e., a decomposition into identical electronic units satisfying series manufacture and test criteria. It is sufficient to integrate with such units the solar cells and the energy conversion and storage functions (possibly a simple electrical capacitor), these functions being marginal compared to the other functions. This full meshing approach excludes antenna operation on both sides, which must be achieved by duplication and reverse disposition of at least part of the antenna. It goes without saying that this duplication in the heightwise direction may also serve to increase the gravity gradient and to reduce the need for the spaces previously mentioned that have no antenna function.

The principle of antenna energy autonomy without recourse to centralized batteries excludes operation in eclipses and is therefore more suitable for an ascending local time of 18 H (or 6 H), for which the eclipse occurs for less than 20% of the orbit and only at the south (or north) pole for a few months of the year, which represents no penalty for most missions.

On the other hand, operation is continuous between eclipses.

This is of operational benefit. Furthermore, the electronics and the cells are subjected to a low level of thermal cycling. This represents an improvement in terms of thermal rating, reliability and durability.

The foregoing remarks also apply to the situation in which the plane containing the member 11 is not in the plane of the orbit but merely contains the center of the Earth. The adoption of a yaw offset of the plane of the member 11 relative to that of the orbit, possibly variable along the orbit, can provide an additional degree of freedom to optimise solar illumination, in particular in the case of an orbit that is not locked to 6 H/18 H or even a non-heliosynchronous orbit.

Deformable (or Flexible) Antenna Forming Member 11 and GPS Sensors

As shown in FIGS. 7 and 8 in particular, the member 11 is made up of a plurality of panels 14 hinged together and, when deployed, coarsely aligned with the mean plane of the member 11. The deployment is effected along the height H of the member 11. The various panels 14 are folded into the equipment module 12 at launch.

The mechanisms associated with the panels are rated at least for their deployment and, once the nominal attitude has been acquired, coarse alignment (positioning error of 10 cm over a height of 10 m to 15 m or more between the two end panels, error of 1 cm between two consecutive panels).

Under ordinary conditions, i.e., when deployed, the forces that they have to transmit are very low and limited to the reactions to the gravity gradient torques, solar pressure torques and attitude control torques (applied by the equipment module). These disturbances occur at the orbital angular frequency and therefore can easily be decoupled from the natural modes of the member 11, whilst keeping them sufficiently slow to enable the measurement of deformations and errors and the latter to be taken into account by the transmitted or received wave control means.

The transient loads during thruster burns and the ensuing attitude control compensations, as well as during the initial attitude acquisition phase, are higher but allow misalignment of greater amplitude (the mission is interrupted during these thruster burns) that are reduced in size and damped by the mechanisms and/or the couplings between the panels.

GPS sensors 15 are distributed over the various panels 14.

Each of the sensors 15 includes at least a GPS antenna, the GPS signal demodulation and measurement functions possibly being physically grouped together for a plurality of sensors, for example at the level of one panel 14. All of the GPS signal demodulation and measurement functions can use the same oscillator, located in the equipment module 12, for example.

Measuring the relative position of two sensors 15 of the member 11 is based on interferometric measurements of the phase difference between the two sensors of a signal from the same GPS satellite. Measuring the relative position of the two sensors 15 requires at least two interferometric measurements on two separate satellites if the distance between the sensors is known, or at least three satellites otherwise. In practise, each of the interferometric measurements is differentiated relative to a measurement from an additional satellite in order to avoid skews specific to each of the sensor bases (double phase difference principle).

Generally speaking, with these GPS sensors, the aim is to measure the relative position of the sensors and the absolute attitude of the mean plane that they form. This can be achieved by centralized processing of the phase measurements from the various sensors 15, for example in the equipment module 12. To reduce the centralisation of the data, it is also possible to define a processing step at the level of each panel 14 in respect of the relative positions of the sensors 15 of the same panel 14, which is equivalent to the absolute attitude of the panel if the latter is not subject to any internal deformation, leaving only the relative position between the reference sensors defined for each of the panels to be calculated centrally.

Each of the panels 14 includes a minimum of three GPS sensors 15, which is sufficient if there is no internal deformation of the panel. The need for structural lightness can lead to thermo-elastic modes of deformation within the panels 14. At least one additional GPS sensor 15 is required for each panel 14 to measure such deformation.

The virtually plane geometry of the satellite reduces the multipath sources that constitute the main limitation of the GPS system for precise relative positioning. The only multipath source is the equipment module 12 and at least the main effects of the latter can be eliminated.

As previously indicated, the panel or panels 14a connected to the equipment module 12 have no antenna function. They are therefore not equipped with GPS sensors. As shown in FIG. 9, to eliminate the multipath sources at the sensors of the other panels 14, it is sufficient to ignore the GPS satellites from which signals are received at a minimal incidence. The latter will be at least less than the minimal working incidence of the satellite (typically 25°) since some or all of the panels 14a do not block the field of view, for other reasons. This very limited masking leaves sufficient satellites visible for the system to work. Multipaths are thus limited to diffraction by the edge 20a of the plate 20. This diffraction does not favor any particular direction and therefore cannot be masked.

The deformation of the member 11 is compensated at the level of each of the surface units having means for phase-shifting the transmitted or received wave and the phase-shift allows for the depointing of the beam relative to the median plane and the position of the surface unit about and in this median plane. The positions of the surface units are obtained from the positions of the neighbouring GPS sensors.

As in the deformation measuring process, the compensation process can accommodate a local step at the level of each panel. The phase-shift allows for a median plane at the level of the panel and for the relevant depointings and position offsets. It is necessary to add in a consistent way in the same panel a phase term corresponding to the offset of the panel reference point relative to the wave plane of the resultant beam of all the antenna passing through the reference point of a reference panel.

Subject to the preceding provisions, in particular concerning GPS multipaths, flatness compensation can be achieved to within one millimeter and the attitude of the median plane can be determined to within $\frac{1}{10}$th of a degree. This is a perfect response to the requirements of a radar mission, including high-frequency (X band) radar, for which the flatness requirements are the most severe. In order to facilitate these balances in the case requiring high frequencies, it is preferable to place the high-frequency panels at the end of the member 11 opposite the module 12, in order to reduce the effect of residual multipaths from the module 12. This arrangement will always be possible if, as indicated hereinafter, the member 11 never comprises only high-frequency panels (low frequency, panels 14a).

Of course, compensation based on GPS sensor phase measurements is applied in the same way in the case where the antenna forming member is a single panel subject to deformation.

Equipment Module and Launch System

The equipment module 12 will now be described in more detail.

The equipment module 12 carries the various equipment units excluding the antenna, in particular the central electronics of the radar, memory means for storing image data, telemetry means, and various ancillary equipment units, including the attitude and orbit control system which includes magnetometers, magnetic torquers, a fuel tank and a thruster, and telecontrol and on-board control means.

The module 12 also includes a battery, the capacity of which is reduced to the specific requirements of the module if the energy autonomy principle is adopted in respect of the member 11.

These various equipments are communally designated by the reference number 16 in FIGS. 9 and 10.

If the energy autonomy option is adopted in respect of the member 11, the first of the panels 14a attached to the module 12 carries an independent solar generator that powers the equipment module 12 between eclipses. During eclipses, the solar generator is relayed by the battery to preserve the data stored on board and the operation of the equipment module. The battery is also used during orbital injection.

As shown in FIGS. 10 and 11, the equipment module 12 also provides the mechanical strength of the bundle of panels 14 at launch.

To this end, the equipment module 12 is made up of a cylindrical support envelope into which the panels are folded and which has a pyrotechnic trap for deploying them. This cylindrical shape extends the circular interface 17 with the launch system and facilitates compliance with the stiffness requirements imposed by the launch system. The dimension of the satellite along the axis of the launch system corresponds to the length L of the member 11. The length of the cylinder is determined directly by the length L of the antenna, while the diameter is constrained by the elementary height of a panel 14.

The cylindrical envelope is made up of two shells 18 and 19 assembled together after integration of the bundle of panels and the equipment units of the equipment module 12. One shell 18 integrates the various equipment units of the equipment module 12. The other shell 19 carries a pyrotechnic cutter defining a trap with two flaps. The explosion of this cutter forms and ejects the two flaps which are held open by two hinges carried by the shell 19 and disposed along the interface with the shell 18.

At launch, the various panels 14 are folded one on the other and held against a plate 20 attached to the shell 18 by tie-rods passing through all of the panels. The other face of the plate carries the remainder of the equipment units of the satellite.

This architecture facilitates making allowance for the various mass centering requirements. Centering at launch along the axis of the launch system is obtained by the adequate offsetting of the plate 20 relative to the median plane of the cylinder, the cylinder itself being centered on the axis of the launch system. Both types of centering in the deployed mode, namely the alignment of the center of mass of the module 12 both in the plane of the antenna and vertically relative to the middle of the antenna in the direction L (facilitating the natural alignment by the gravity gradient of the shorter inertia axis of the member 11 along the local vertical and limiting solar pressure torques on the satellite) are achieved by balancing the equipment units on the plate 20.

The open configuration of the flaps 19a and 19b does not leave any source of unwanted reflection of GPS signals towards the antenna 11 other than the plate 20, at the same time leaving open the field of view required for the telemetry antenna carried by the shell 18.

The proposed cylindrical shape of the satellite in the launch condition also has the advantage of eliminating the need for the payload fairing of the launch system. The addition of a nose cone, the elimination of the only external appendage (the telemetry antenna) by the adoption of an antenna pressed against the shell or deployed in orbit, and the optional addition at the base of the cylinder of a skirt covering the connection to the launch system reconstitute the aerodynamic configuration equivalent of a payload fairing. This option allows for negotiation of an increase in the mass and the authorized maximal overall size of the satellite.

Provided that the length L can remain less than 5.5 m, it is compatible with the payload fairings of planned small launch systems (Lockeed Martin LLV3, McDONNELL DOUGLAS DELTA-LITE) or of existing medium-size launch systems, such as DELTA 2, if the thicknesses of the folded antenna forming member 11 and the equipment module 12 remain compatible with a diameter of less than 2 m. This is the case in particular for a total height of the antenna forming member 11 less than 13 m or 15 meters (8 or 9 panels 1.7 m high). These antenna dimensions allow missions which, taking a conventional approach (with a conventional geometry and a standard equipment module), lead to greater masses and volumes and therefore to the need for more costly launch systems (ARIANE 5, ATLAS II AS).

General Architecture of a Panel

FIG. 12 shows the general architecture of one possible embodiment of a panel of the satellite of the invention, in the case of radiation from one side only of the panel.

The panel has a sandwich structure comprising an optional radome 21, a radiating panel 22, a NIDA (registered trademark) type intermediate aluminum structure 23 carrying electronic means 27, thermal protection layers 24 and a plate 25 carrying the solar cells 13.

I-section vertical and horizontal stiffeners 26 are applied to the intermediate structure 23 and carry the plates 25.

As shown in FIG. 13, the panel is divided into a plurality of functional units 28.

The electronic means 27 for the functional units 28 are accommodated between the structure 23 and the thermal protection layers 24. They include transmit/receive and phase-shift means and associated control means. They also process the power that they require supplied to them by the solar cells 13 on the back of the panel.

Each panel has at least one sleeve 29 passing through it, through which passes a tie-rod for fixing it into the support envelope at launch.

Since a member 29 and a GPS sensor 15 both neutralize the antenna function, they can advantageously be grouped together in a common functional unit 28 that is partly neutralized for the antenna function. This member 29 and this GPS sensor 15 are then advantageously disposed at the edge of the unit 28 near the crossover of two stiffeners 26, as shown in FIG. 14.

The microwave equipment units of the panels are supplied with power directly by the solar cells associated with the panel, autonomy being achieved either at the level of each unit or at the level of a group comprising several units.

Each panel or half-panel can be fed with the microwave signal by optical fibers or by coaxial cables, in a star arrangement from the equipment module 12 or in a daisy-chain arrangement from the top panel (that furthest away from Earth), in order for the physical length of the cables to constitute part of the necessary delay lines.

The processing modules (BFN, primary module, secondary module) are connected to the equipment module 12 by a control/command bus.

The electronic means 27 grouped together at the same function unit 28 are implemented in integrated or hybrid technology.

In the case of a panel radiating from both sides, one possible implementation replaces the plate 25 carrying the solar cells by a plate carrying the radiating elements. In both cases, to facilitate integration and connection to the electronic equipment units 27, it is preferable to limit the surface area of these plates, one plate closing after integration each of the compartments formed by the rectangular grid of the stiffeners 26. In this way partial demountability and repair of the panel remain possible.

Dimensions of Solar Generators

The solar cells 13 are GaAs/Ge type cells, for example, providing the necessary current at 10 volts in the worst case (i.e., at the end of their service life, with worst case solar incidence and at 120° C.). A string of 16 cells of this type is provided for each functional unit of the member 11.

The GaAs technology chosen (rather than the silicon technology) resists higher solar cell temperatures.

The energy generated in this way is stored in electrolytic and ceramic capacitors included in the means 27 for limiting the voltage drop during the radar pulse to that which is tolerable by the equipment and maintaining performance (typically 10%).

The voltage is limited to 10 volts.

Attitude and Orbit Control

In the simplest version, a single propulsion thruster directed along the roll axis is used. Attitude control is then essentially dimensioned by transient disturbances in yaw, occurring during orbit acquisition and stationkeeping thruster burns (in direction V), and due to the misalignment of the single thruster. Stationkeeping corrections are divided into elementary pulses of very limited duration in order to remain effective, given the depointing caused in yaw. These elementary pulses are followed by reacquisition in yaw. The duration of the stationkeeping procedure can be long, but the solar illumination and thermal conditions of the antenna continue to be assured between two elementary pulses. During stationkeeping maneuvers, the thrusts are weaker and most importantly relatively infrequent. For this type of satellite, because of the low friction (very small cross-section in direction V), this approach of subdivision and spreading of the reaction time of the attitude system is acceptable, even if this requires interruption of the mission over one or more orbits. At the cost of increased complexity, the use of a plurality of thrusters controlled in terms of burn time would, if necessary, counter in real time the unwanted torque in yaw and reduce the total duration of the burn. The peculiarities of the satellite make cold gas propulsion feasible, the increased mass of the storage tanks compared to a hydrazine solution being either acceptable, including for a mission duration of ten years given the low friction, or welcome, in order to increase the gravity gradient.

It may be necessary to correct the plane of the orbit during the mission, in particular for orbits using a local time other than 6 H/18 H. This type of maneuver differs from thruster burns in the direction V by the prior introduction of rotation of the satellite by 90° in yaw to bring the thruster into a position normal to the plane.

Before deploying the antenna, the attitude can be measured by filtering magnetometer measurements, with an accuracy in the order of 1°; after deployment the GPS signals picked up by the antenna are used and the accuracy is improved to better than 1/10th of a degree.

The magnetic torquers provide the torques needed for damping the pendulum effects of the gravity gradient in pitch and in roll and to counter permanent effects (solar pressure) and to recover from transient effects in yaw during thruster burns.

The initial attitude of the antenna forming member 11 is advantageously acquired in the following manner.

The member 11 is deployed, after which a control law is applied to the magnetic torquers designed to reduce the rotation speed using only the magnetometer measurements.

The satellite is stabilized about a gravity gradient equilibrium position.

Two equilibrium positions are possible, however, one with the member 11 below and the other with the member 11 above the module 12.

If the antenna forming member 11 is deployed below the equipment module 12, the satellite is rotated in yaw so as to orient the solar generators towards the sun, in order to charge its batteries and to render it autonomous, after which a new control law is applied to the magnetic torquers in order to rotate the satellite again about all its axes, after which the speed reduction control law is used again to return to a gravity gradient equilibrium position.

The process of starting and stopping rotation is repeated until the antenna is in the correct position.

Each time rotation is started, the antenna 11 has one chance in two of re-acquiring the required attitude.

All this leads to a rudimentary attitude and propulsion system made up of (ignoring redundancy): three magnetic torquers, one three-axis magnetometer, one on-board computer, one GPS receiver and four GPS receive antennas (in this example, the antennas on the panels which are the farthest apart are used), and a propulsion subsystem based on a single thruster.

Note that this attitude control system, using no optical sensors of any kind (terrestrial, solar or stellar), enables operation independent of the local time or variations of the latter during the mission.

Inverted Attitude Satellite (Member 11 Below Equipment Module) or Satellite When Attitude is Immaterial The nominal attitude of the satellite can be inverted relative to that described until now, i.e., consisting of an antenna forming member below the equipment module 12.

The resulting advantage is the elimination of the radar field of view constraints at low values of incidence. The panels 14a adopted to avoid blocking the field of view may nevertheless be needed to avoid excessive masking of the GPS satellites at the level of the top panels 14, which in this situation depends only on the minimal number of GPS satellites required for operation. GPS incidence directions likely to cause multipath by reflection at the plate 20 of the equipment module are now naturally masked by the Earth. The daisychain feeding of the microwave signals to the panels starts from the first panel near the module 12, not the panel at the opposite end, as is the case with the attitude as previously described.

However, the telemetry antenna must be differently arranged to avoid the member 11 blocking its field of view. One solution is to have two antennas on the equipment module, one on each side of the plane of the member 11, so that there is always one antenna directly visible regardless of the situation of the station relative to the plane of the orbit. One antenna switching operation at most is required per pass. Offsetting the telemetry antennas out of the plane makes it possible to overlap the fields of view from the two antennas and to manage the switchover time more flexibly when the station enters the plane of the orbit.

Also, the satellite can be designed to operate in the first of the equilibrium positions obtained after deployment and thereby avoid the procedures for starting and stopping rotation described previously. From the hardware point of view, all that is required is to provide the two types of telemetry link corresponding to both geometries, dimensions of the panels 14a adapted not to block visibility for the worst case scenario, the two switchable ways to start the panel microwave signal feed system, and thermal control of the module compatible with both geometries. The remaining adaptations to the effective geometry have only minor repercussions, primarily software in nature.

All the foregoing applies equally to the situation in which the member 11 is in two parts, one above and one below the module 12.

Application to Low-Frequency, High-Frequency or Multi-Frequency Missions

All other characteristics being kept exactly the same for the mission, the functional height of the antenna forming member 11 is directly proportional to the wavelength, as a result of which the gravity gradient conditions may not be acquired naturally for high-frequency (X or C band) missions, whereas this is often the case for low-frequency (S, L or P band) missions. The introduction of solid or hollow panels 14a in addition to the solar generator panel of the equipment module is necessary above all at high frequencies.

Applied to the frequency combination that constitutes one of the requirements of the new generations of radar, the system remains entirely optimal since all of the panels for the various frequencies contribute to the overall gravity gradient and it is not (or no longer) necessary to add panels 14a. In particular, for an L band mission with eight functional panels 14, it is sufficient to add an identical size X band panel to constitute a two-frequency mission, subject to marginal resizing of the equipment module relative to the single-frequency situation. The various frequencies can use different functional lengths L of the antenna, a standard panel length being maintained by non-functional extension of the surface of the shorter panels, facilitating the maintenance of centering conditions (masses, center of solar pressure thrust, etc.), if necessary.

With the energy autonomy option in respect of each of the antennas of the member 11, the "carpeting" of the solar cells on the back of the panels must be more dense at high frequencies, since, in general, the power requirements are increased (this is the case for radar) and the antenna height is reduced. In the event of energy insufficiency and of recourse to an additional area of cells elsewhere on the member 11 than on the back of the antenna, it is preferable to place these areas in the direct vicinity and on either side of the antenna in order to limit the power transfer connections and possibly to retain the full electronic meshing concept previously described.

Application to Single Pass Radar Interferometry Missions

Single pass radar interferometry is intended primarily for obtaining topographical data and consists in forming two images simultaneously from two spaced antennas, one antenna transmitting and both receiving. The accuracy of the data depends on the length of the base formed by the two antennas normal to the speed vector, relative to the wavelength, so that for antennas on the same satellite interferometry is generally feasible only at high frequencies (X or C band) and with antenna bases exceeding 10 m or 15 m.

It is a simple matter to add an interferometer mission to a radar satellite of the present invention. The second, receive only antenna can generally be a single panel 14, since it may not be necessary to seek operation at high values of incidence (which determine the antenna height) and because the requirements for solar generators on the back of the antenna are significantly reduced by the fact that the antenna is a receive only antenna, thus consuming little or no power. In the case of a high-frequency only mission, this panel 14 is added between the panel 14a adapted to avoid blocking the field of view (and possibly carrying the solar generator for the module) and the other panels 14a introduced specifically for the gravity gradient. If the latter are absent or present in insufficient numbers, others are added in order to achieve the required base height. In the case of a multifrequency mission, the interferometric mission generally concerns only one high frequency, the interferometric receive panel 14 and the main antenna at the high frequency are placed at opposite ends of the member 11, while both are separated from the equipment module by the panel 14a adapted to avoid blocking the field of view. The interferometer base obtained in this way may if necessary be increased in size by adding further non-functional panels 14a.

To reduce further the impact of the introduction of the interferometric function, the functions of solar generator for the module and of interferometric receive antenna may be combined in one and the same panel 14a. The very low consumption of the latter preserves the generator function for the module, and there is no need for provisions to avoid blocking the field of view of the receive antenna, since there is no need for it to be aimed at the lowest values of incidence, or it may occupy only the upper and therefore better exposed part of the panel if the required height is less than one panel, which may be the case in particular if very high frequencies are not used.

The interferometric function is thus added at marginal cost, although for a conventional satellite it is necessary to introduce a dedicated deployable mast carrying the receive antenna at the end.

Shared and Balanced Operation in an International Cooperation Context

International cooperation in space, if it is to succeed, must assure equitable sharing of the roles of the various countries, not only in development but also in operation. Unfortunately, for a remote sensing system, the key operation task, namely programming, must be centralized in order to assure optimal management of demand without conflict and to safeguard the integrity of the satellite. This raises an insoluble problem in the absence of a majority partner who would naturally assume the role of accommodating the mission programming center on its territory, together with the satellite control center, since the latter cannot generally be separated from the programming center.

The scheme whereby each partner retains control of the use of the satellite for imaging in the region delimited by the circle of visibility of its station, in a similar manner to that adopted for INTELSAT type telecommunication satellites (renting of a repeater or of a beam) has not been feasible until now. The use of resources in one portion of the orbit always affects their availability elsewhere, so that centralized coordination remains indispensable. In optical remote sensing, time-delays on changing the aiming direction can be very long (to allow reorientation of the satellite or mirrors), whereas for a modern agile radar the problems are the time to recharge the batteries, transmitter on/off limitations or thermal condition limits of the equipment units.

By adopting the energy autonomy option for the member 11, the theory of the satellite as shown in FIG. 4 and subsequent figures allows continuous operation of the radar between eclipses. Since in this scheme of geographical sharing the data collected is not stored on board but retransmitted in real time to the ground station (there is no use of a store and forward function), the problem of sharing the satellite can be reduced to a simple distribution of circles of visibilities between partners and guaranteeing each autonomy and discretion in programming and data acquisition.

Nevertheless, this new capability of partitioning access to the satellite geographically is not sufficient in itself to allow each partner to retain control of the satellite in its sector. It is also necessary to make allowance for the common requirements for managing the satellite and safeguarding its status. Note in this connection that the full electronic meshing architecture of the member 11 provides hardening against any damage caused by programming. Each basic functional unit made up of a radio frequency module and a corresponding block of solar cells must dissipate within itself virtually all of the energy supplied by the cells independently of its functional contribution to the whole so that the unit is subject to only one thermal regime, governed by the current status of the solar cells and of the electronics and independent of the activation and programming status of the unit. The member 11 has no redundancy, but is merely subject to progressive deterioration of its performance associated with failures or deterioration of elementary functional units. Each partner can agree on the optimal way to manage such deterioration (by the choice of the units to be deactivated and the antenna diagram laws to be formed) without this affecting the process of deterioration itself (no fault propagation process).

Beyond real time programming of imaging, technological operation of the member 11 and of the image product type (ground swath, waveform, resolution, incidence), each partner can develop and deploy radar expertise according to its local requirements and affinities. The part of the payload integrated into the equipment module also benefits from a continuous power resource, but unlike the antenna forming member 11 is not constituted by an accumulation of a large number of identical functional units. The low level of operational criticality of the technologies employed (no tubes, no mechanisms, no configuration time-delay, etc.) and the reduced size of the functions make feasible a redundancy system of blocks around a reduced number of switches that can be activated interchangeably by each of the partners. In this way the concept of sharing can be extended to all of the payload.

The operation of the satellite also entails orbit control functions (orbit maintenance and maintenance of the coarse attitude of the panel array) which require control from the ground. Not affected by the use of the payload, these functions can, on the other hand lead to nominally predictable restriction of access affecting all partners infrequently (example: stabilization times and maneuvers). They must be centralized and entrusted to a single agency charged with advising the partners but operating without interaction with the latter.

The preceding sharing scheme is described for the most static mode possible in order to illustrate the total elimination of interconnections and interdependencies (sharing of orbital arcs or coverages) and benefiting from increased ease of starting programs involving a large number of small partners. Other agreements may be feasible on this basis: closer agreements between partners, either individual or generalized, for a dynamic allocation of arcs, or introduction of a central partner specifically responsible for recorded images and management of the on-board memory in unassigned arcs or on behalf of local partners.

It is important to note that this concept of sharing is first and foremost related to the omnipresence of the energy resource. This can also be achieved on a conventional satellite by overrating the solar generator and therefore using heavy equipment modules, in turn leading to heavy launch systems. The particular benefit of a satellite as shown in FIG. 4 and subsequent figures is that this capacity is inherent and is obtained at zero cost.

What is claimed is:

1. A low orbit remote sensing or telecommunication satellite including a generally plane antenna forming member and a solar generator, wherein said solar generator comprises solar cells which are carried by the antenna forming member on at least one of its faces, said antenna forming member having an antenna function on at least one other face.

2. The satellite according to claim 1, wherein the antenna forming member has antenna functions on both faces.

3. The satellite according to claim 1, wherein part of the antenna forming member does not carry solar cells and has an antenna function on both faces.

4. The satellite according to claim 1, wherein the solar cells cover energy requirements of at least one antenna of said antenna forming member.

5. The satellite according to claim 1, wherein said solar cells are cells using AsGa or silicon technology.

6. The satellite according to claim 1, including said generally plane forming member lies substantially in a plane passing through a center of Earth, wherein said antenna forming member carries antenna active elements on both of its faces.

7. The satellite according to claim 1, wherein a part of said antenna forming member has no antenna function and carries solar cells.

8. The satellite according to claim 7, wherein the part or parts having no antenna function which carry solar cells provide at least a power supply to an equipment module between eclipses.

9. The satellite according to claim 1, wherein said solar cells, which cover the energy requirements of an antenna, are disposed on a back of said antenna, and on spaces having no antenna function on either side of said antenna.

10. The satellite according to claim 9, wherein said antenna features a mesh of coupled electronic surface elements provided directly by a block of at least one solar cell.

11. The satellite according to claim 10, wherein said block directly faces a surface element.

12. The satellite according to claim 1, wherein said solar cells of said antenna forming member cover energy requirements of said antenna forming member.

13. The satellite according to claim 1, wherein said satellite is in orbit around an heavenly body, said orbit being heliosynchroneous and wherein the antenna forming member lies substantially in the plane of its orbit, a face of the antenna carrying solar cells being illuminated by the sun.

14. A low orbit remote sensing or telecommunication satellite including a generally plane antenna forming member, said antenna forming member lying substantially in a plane passing through a center of the Earth, wherein said antenna forming member has a deformable geometry and includes transmitted or received wave control means distributed over its surface, and includes a plurality of position and/or deformation and/or misalignment sensors distributed over said antenna forming member and allowing measurement of deformations and/or misalignments and their subsequent compensation by said control means.

15. The satellite according to claim 14, wherein said sensors are terrestrial or satellite radio positioning sensors which also enable measurement of absolute attitude errors and their subsequent compensation by said control means.

16. The satellite according to claim 15, wherein said sensors are GPS sensors.

17. The satellite according to claim 15, wherein it includes means for differential processing of phase measurements on radio positioning signals supplied by each sensor for measuring relative sensor positions and absolute attitude of a median plane defined by said sensors.

18. The satellite according to claim 14, wherein it includes an equipment module which intercepts the plane of the orbit, and said antenna forming member is situated on one side only of said equipment module.

19. The satellite according to claim 14, wherein it includes an equipment module which intercepts the plane of the orbit, and said antenna forming member extends on both sides of said equipment module.

20. The satellite according to claim 19, wherein the two parts of said antenna forming member are in two separate planes the intersection of which passes through a center of the Earth.

21. The satellite according to claim 14, wherein it includes an equipment module the center of gravity of which is on a shortest inertia axis of said antenna forming member so that natural equilibrium due to the gravity gradient along the gravity axis of said antenna forming member is reinforced and so that the solar pressure torques on said satellite are limited.

22. The satellite according to claim 14, wherein by adding to said antenna forming member a part with no antenna function located near the module, it assures for an antenna or antennas of said antenna forming member minimal masking by an equipment module and for radio positioning sensors an angular offset relative to an normal to said antenna forming member of the direction of reception of radio positioning signals short of which there is no multipath by reflection at the module and beyond which the signals are ignored.

23. The satellite according to claim 14, wherein said antenna forming member includes in its height partly hollow part having no antenna function which contributes to natural stabilization of said satellite about the roll and pitch axes by the gravity gradient.

24. A satellite according to claim 14, wherein said antenna forming member comprises a plurality of different antennas operating at different frequencies juxtaposed along a gravity axis.

25. The satellite according to claim 24, wherein said antenna forming member includes two antennas for the same frequency enabling interferomatric radar remote sensing, said antennas being separated along a local vertical axis.

26. The satellite according to claim 25, wherein the height of the antenna forming member defined by the dimension along the gravity axis is greater than its dimension perpendicular to this axis, so that said satellite is naturally stabilized about the roll and pitch axes by the gravity gradient and wherein deployment is effected in the vertical direction.

27. A low orbit remote sensing or telecommunication satellite including a generally plane member made up of a plurality of panels hinged together, and equipment units associated with or ancillary to said generally plane member wherein said satellite includes a support envelope that integrates in its interior at launch the equipment units and the panels and which has a pyrotechnic trap for deployment of the panels, and wherein the support envelope includes two half-shells, one of which integrates the various associated and ancillary equipment units and the other of which half-shells carries a pyrotechnic cutter delimiting a trap with two flaps and an explosion of which defines and ejects the two flaps which are thereafter held open by two hinges disposed along the interface with the first half-shell so that the panels can be stowed at launch in a housing defined between said shells and thereafter deployed on one side only of the satellite through the trap.

28. The satellite according to claim 27, wherein the support envelope is made up of two shells assembled onto a median part, the median part integrating the various associated and ancillary equipment units, while each of the lateral shells carries a pyrotechnic cutter delimiting a trap with two flaps and an explosion of which defines and ejects the two flaps which are thereafter held open by two hinges carried on the same half-shell and disposed along the interface with the median part, so that the panels can be stowed at launch in two housings defined between each of the lateral shells and the median part and thereafter deployed from each side of the satellite through a corresponding trap.

29. The satellite according to claim 27, wherein during a launch phase, the panels are folded and pressed against a plate to which they are attached by tie-rods.

30. The satellite according to claim 29, wherein at least one sleeve adapted to have pass through it a tie-rod for fixing it to the plate passes through each panel.

31. The satellite according to claim 27, wherein the shortest inertia axis of the support envelope and of various panels is oriented at launch along the launch system axis, and the deployment axis is normal to the launch system axis.

32. The satellite according to claim 31, wherein an exterior shape of the support envelope in the launch configuration is adjusted aerodynamically to substitute for a payload fairing.

33. The satellite according to claim 27, wherein the support envelope and the associated and ancillary equipment units constitute the equipment module, the shortest inertia axis of the latter being parallel to the plane of the orbit.

34. The satellite according to claim 27, wherein a panel of said plurality of panels has a sandwich structure comprising a randome, a radiating panel, an intermediate NIDA structure carrying electronic equipment, an optional thermal protection layer, a plate that carries solar cells and/or radiating elements, said panel further including stiffeners disposed on an intermediate structure to support plates that carry said solar cells and/or radiating elements.

35. The satellite according to claim 34, wherein at least one sleeve adapted to have pass through it a tie-rod for fixing it to said plate passes through each panel, and wherein said sleeve is disposed in the vicinity of the crossover between the two stiffeners.

36. A low orbit remote sensing or telecommunication satellite including a generally plane antenna forming member lying substantially in a plane passing through the center of Earth,
   (a) said satellite along a height of the antenna forming member having an array of antenna elevation control means, each of said control means acting on a control point of an antenna portion of said antenna forming member, the control points being separated by spacings along the height of the antenna forming member;
   (b) the antenna portions defining an array of antenna portions, each of said portions presenting a fixed elevation diagram covering a desired range of incidence values on the Earth, the array of antenna portions defining a main lobe and lateral unwanted lobes;
   (c) the control means of each antenna portion comprising means to control the phase and amplitude of the waves received and emitted by said antenna portion so as to enable depointing of an orientation axis of the main lobe of the antenna portions array to cover a desired range of incidence values;
   (c) wherein the spacings between the control points are such that, for any orientation axis on which the main lobe of the antenna portions array is depointed, the array unwanted lobes are substantially physically masked by at least part of the satellite or rejected beyond Earth, the gain of the array main lobe modulated by the elevation diagram of the portions being maintained at a minimum level and the gain of the unwanted array lobes modulated by the elevation diagram of the portions being maintained below a maximal level.

37. The satellite according to claim 36, wherein an antenna portion associated with a control point is constituted by a plurality of elementary radiating elements and wherein a constant phase-shift profile with a fixed ramp is introduced between the radiating elements of a same control point.

38. The satellite according to claim 36, wherein the antenna portions associated with the phase amplitude control means are grouped in a vertical direction into sections each associated with a time-delay control point for maintaining in a go direction and a return direction a temporal path from a central source of transmitted signals (from a central point of recombination of received signal) to a target point on the ground regardless of a boresight in elevation and independently of the section traversed, and wherein a fixed differential time-delay distribution is established to within a given section and from the elementary antenna portions providing for a particular mean boresight a given temporal path to and from the target point on the ground independently of the elementary portion traversed in the section.

39. The satellite according to claim 38, wherein the distribution of the signals to and from each of controlled time-delay sections is effected in a successive distribution configuration, from one side of said antenna forming member opposite the Earth to a second side of the antenna, the elements which define said successive distributions constituting part of the necessary delay lines.

40. A low orbit remote sensing or telecommunication satellite including a generally plane antenna forming member lying substantially in a plan passing through the center of Earth, (a) said satellite along a height of the antenna forming member having an array of antenna elevation control means, each of said control means acting on a control point of an antenna portion of said antenna forming member, the control points being separated by spacings along the height of the antenna forming member;

(b) the antenna portions defining an array of antenna portions, each of said portions presenting a fixed elevation diagram covering a desired range of incidence values on Earth, the array of antenna portions defining a main lobe and lateral unwanted lobes; and (c) the control means of each antenna portion comprising means to control the phase and amplitude of the waves received and emitted by said antenna portion so as to enable depointing of an orientation axis of the main lobe of the antenna portions array to cover a desired range of incidence values;

wherein the spacings between the control points are substantially equal to 2 $\lambda$, $\lambda$ being the operative wavelength.

* * * * *